US006988709B2

(12) United States Patent
Scaramucci

(10) Patent No.: US 6,988,709 B2
(45) Date of Patent: Jan. 24, 2006

(54) BEARING RETAINER FOR TRUNNION MOUNTED BALL VALVE

(76) Inventor: John P. Scaramucci, P.O. Box 890720, Oklahoma City, OK (US) 73189

( * ) Notice: Subject to any disclaimer, the term of this patent is extended or adjusted under 35 U.S.C. 154(b) by 47 days.

(21) Appl. No.: 10/860,821

(22) Filed: Jun. 4, 2004

(65) Prior Publication Data

US 2005/0269542 A1 Dec. 8, 2005

(51) Int. Cl.
*F16K 5/06* (2006.01)
(52) U.S. Cl. ............................ 251/315.14; 137/315.18
(58) Field of Classification Search ................ 251/214, 251/315.1, 315.14; 137/15.22, 315.18
See application file for complete search history.

(56) References Cited

U.S. PATENT DOCUMENTS 3,277,919 A * 10/1966 Piccardo ................ 137/315.19
3,497,178 A * 2/1970 Priese ........................ 251/174
4,254,793 A * 3/1981 Scaramucci ............ 137/246.22
4,342,330 A 8/1982 Wieveg et al.
4,867,414 A 9/1989 Hubacek

OTHER PUBLICATIONS

Grove, Energy Valve Division; Grove Ball Valves catalog; B-5 Material Specifications; Nov. 1998; p. 5; Bulletin No. 209; Grove; stafford, Texas.
Cooper Cameron Corporation; 1998-99 Product Source Book; DynaSeal® 370CT Trunnion Ball Valves; Jun. 1998; p. 11; vol. 1; Copper Cameron Corporation; Missouri City, Texas.

* cited by examiner

*Primary Examiner*—Edward K. Look
*Assistant Examiner*—John K. Fristoe, Jr.
(74) *Attorney, Agent, or Firm*—Dunlap, Codding & Rogers, P.C.

(57) ABSTRACT

A bearing retainer for a valve having an internally mounted stem and valve member with a trunnion and a bearing positioned thereabout is disclosed. The bearing retainer has a retainer body having a bearing receiving opening extending from a first side to an opposed second side and a stem receiving slot formed in the first side thereof in open communication with the bearing receiving opening. The retainer body is disposable about the bearing, and the retainer body is configured such that the retainer body is rotatable about the trunnion upon the valve member, the bearing, and the bearing retainer being positioned in the valve chamber with the stem engaged with the valve member.

27 Claims, 6 Drawing Sheets

BEARING RETAINER FOR TRUNNION MOUNTED BALL VALVE

BACKGROUND OF THE INVENTION

1. Field of the Invention

The present invention relates generally to ball valves, and more particularly, but not by way of limitation, to an improved bearing retainer and method of assembly for a trunnion ball valve.

2. Brief Description of Related Art

In the typical construction of a trunnion mounted ball valve, the ball is machined to provide "trunnions" that are mounted in bearings. The bearing-trunnion combination is intended to support the ball in a stationary position relative to the flow path, but allow rotation of the ball between an open position and a closed position. The ball engages a pair of seats to form a seal around the ball. The valve is sealed as a result of the upstream valve seat moving against the ball in response to the line pressure. This is in contrast to a floating ball valve where the ball moves along the flow path and seals against the downstream valve seat as a result of the pressure applied to the ball.

A variety of designs for trunnion type valves exist. Notable design differences include the manner in which an operating stem, used for rotating the ball, is assembled and retained. The stem can be inserted internally from within the body cavity. This is known as a "blow-out-proof" design because the stem cannot be removed without disassembling the valve. Another option is to assemble the stem externally and retain it with bolted glands or pins. Another notable difference is that the trunnions can be assembled internally or externally. When assembled externally they are commonly retained with bolted glands. Alternatively, the trunnions can be machined directly on the ball. The ball-trunnion combination can then be inserted internally along with a bearing retainer.

In designing a trunnion valve, the overall length is determined by industry accepted standards. Therefore, the body section of the valve is the only area that is subject to original design. To produce a valve which can compete economically in the market requires a design that minimizes the overall body size and total weight of materials used to produce the valve body.

The different types of valve construction noted above are the result of trading one feature to gain another with the usual result of a less than optimal design. For example, the "blow-out-proof" stem design is generally considered preferable because it cannot be accidentally removed under pressure. Its simplicity also makes it less expensive to produce when compared with all the extra pieces needed to retain an externally mounted stem. Unfortunately, the "blow-proof" stem is not often used because it requires the overall diameter of the valve body to be increased to allow enough room for the ball to be assembled with the stem protruding into the bore. The result of an increase in total weight negates any design savings because the body material is more expensive than the cost of the eliminated parts. The choice of trunnion design also has important tradeoffs. The external pins, bearings, and means of retention are expensive to produce but require a much smaller overall valve body diameter. Internal bearing retainers are simpler and less expensive to produce but generally require a considerable gap between the ball and the body. As a result, a much larger overall body diameter is needed.

A bearing retainer is used to retain a bearing through which the trunnion extends. The bearing retainer is also known as a "trunnion support" or a "trunnion block." Some designs have modified the internal bearing retainer in an effort to minimize the necessary gap. For example, the bearing retainer can be provided with longitudinal edges that are shaped to better conform to the contour of the ball cavity of the body section. This reduces the gap considerably if an externally loaded stem is used. With an internally loaded stem design, the upper bearing retainer may be slotted on one side to permit the bearing retainer to be moved past the lower end of the stem during assembly of the ball and bearing retainer. However, a slotted bearing retainer reduces the bearing support area of the bearing retainer along the direction of the fluid flow. In turn, a larger bearing retainer and thus a larger valve body is often required to provide sufficient bearing support, thereby obviating the purpose of the slotted bearing retainer.

To this end, a need exists for an improved bearing retainer and method of assembly which permits a particularly small gap between the body and the ball while maintaining internal trunnions in a "blow-out-proof" stem and without sacrificing bearing load strength. It is to such an improved bearing retainer and method that the present invention is directed.

DETAILED DESCRIPTION OF THE INVENTION

Figure 1:
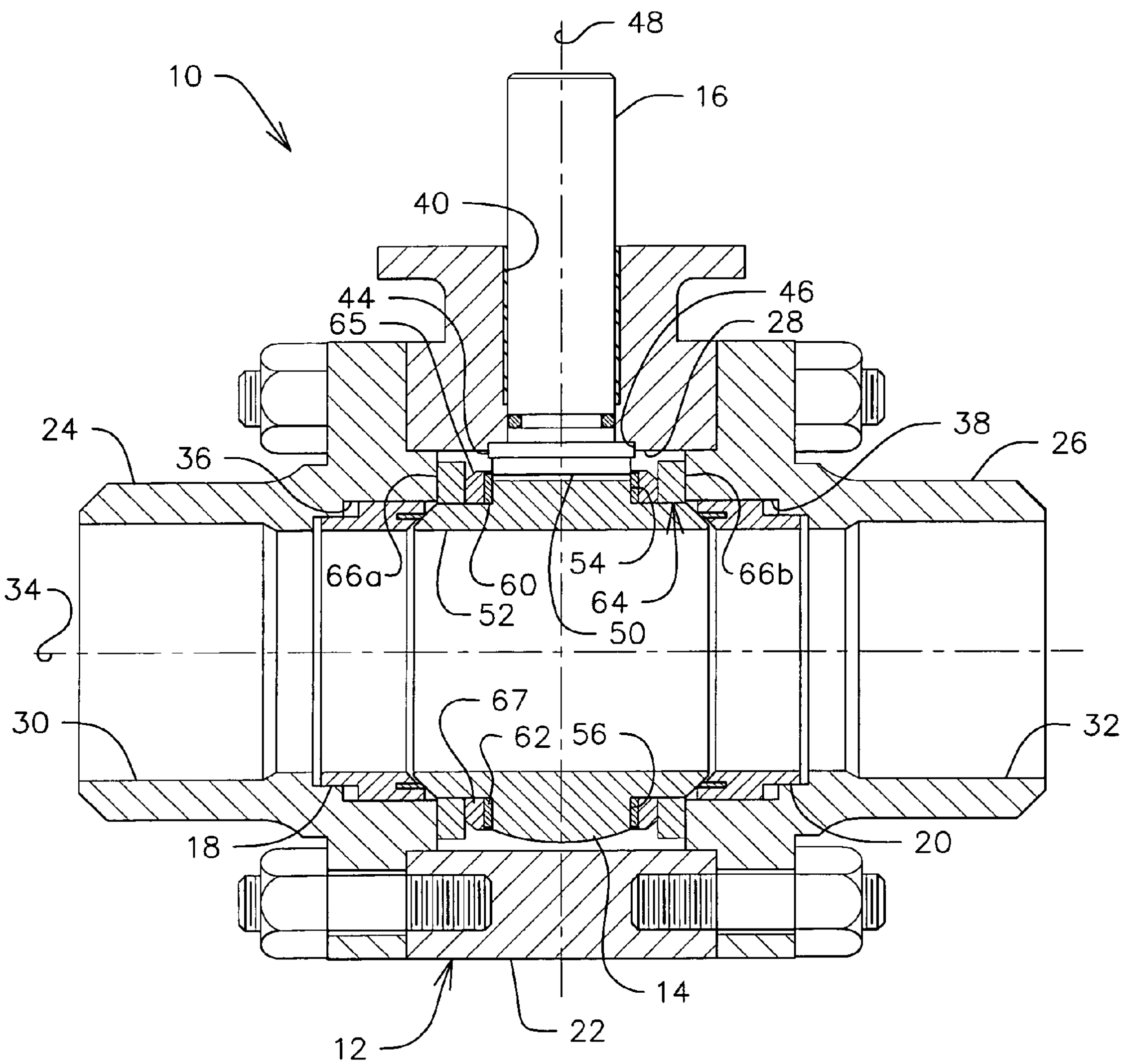
FIG. 1 is a vertical cross section of a trunnion valve constructed in accordance with the present invention.
Figure 7:
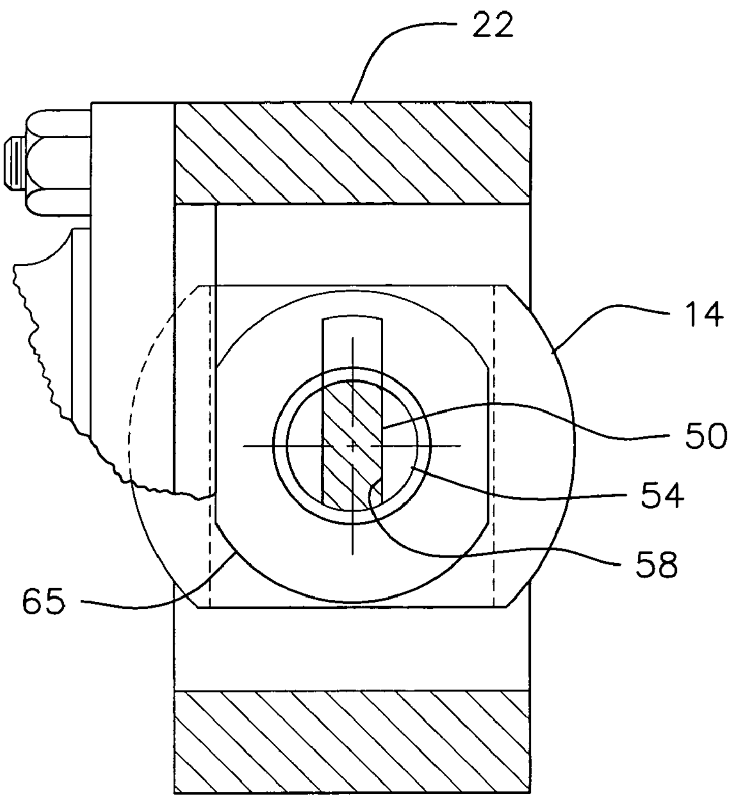
FIG. 7 is a cross sectional view showing the retainer body of FIG. 5 rotated so that the slot of the bearing retainer is perpendicular to the direction of flow and the valve member in a closed position.

Referring now to the drawings, and more particularly to FIG. 1, shown therein is a valve 10 constructed in accordance with the present invention. The valve 10 includes a body assembly 12, a valve member 14 disposed in the body assembly 12 for rotation between an open position (FIG. 1) and a closed position (FIG. 7), and a stem 16 for rotating the valve member 14 between the open position and closed position. The valve 10 further includes a pair of seat assemblies 18 and 20 for forming a seal between the body assembly 12 and the valve member 14.

The body assembly 12, as shown in FIG. 1, includes a body 22, a first end adapter 24 connected to one end of the body 22, and a second end adapter 26 connected to the opposing end of the body 22. It will be appreciated by those of ordinary skill in the art that the body assembly 12 may be a two piece construction where one of the end adaptors 24 or 26 and the body 22 are integrally fabricated as one piece.

The body assembly 12 has a centrally disposed valve chamber 28, and an inlet passage 30 and an outlet passage 32 in communication with the valve chamber 28 to form a flow passageway through the body assembly 12 about a longitudinal flow axis 34. A first seat pocket 36 is formed about the inlet passage 30, and a second seat pocket 38 is formed about the outlet passage 32. The first seat pocket 36 is adapted to receive the seat assembly 18, and the second seat pocket 38 is adapted to receive the seat assembly 20.

The stem 16 extends through a stem bore 40 formed through the wall of the body 22. The stem 16 has a lower portion 44 with an enlarged diameter. The lower portion 44 is adapted to be received in a corresponding enlarged diameter portion 46 of the stem bore 40. The stem 16 is known as an "internally mounted" or "blow-out proof" stem. The stem 16 is mounted within the stem bore 40 in a manner well known in the art for rotation about a trunnion axis 48. A key 50 (shown in FIGS. 1 and 5–7) is formed on the lower end of the stem 16. The key 50 extends diametrically across the end of the stem 16 and is adapted to matingly engage with the valve member 14.

The valve member 14 is mounted within the valve chamber 28 for rotation about the trunnion axis 48 between the opened position and the closed position wherein the valve member 14 is rotated substantially 90 degrees from the opened position to the closed position. The valve member 14 has a central bore 52 which aligns with the inlet passage 30 and the outlet passage 32 to permit the passage of fluid through the valve 10 when the valve member 14 is in the open position thereof. In the closed position of the valve member 14, the seat assemblies 18 and 20 engage the exterior surface of the valve member 14 and internal surfaces of the body assembly 12 to form fluid tight seals which disrupt fluid communication between the inlet passage 30 and the outlet passage 32.

The valve member 14 has the general form of a spherical ball with the central bore 52 formed therethrough extending circumaxially about a diameter thereof. Portions of the valve member 14 are cut away to form a circular first trunnion 54 and a circular second trunnion 56 which is diametrically opposed to the first trunnion 54 and coaxial therewith. A central slot 58 is formed in the distal end of the first trunnion 54 and, for reasons to be discussed below, is preferably oriented along a line parallel to the plane defined by the axis of the central bore 52 and the common axis of the first trunnion 54 and the second trunnion 56 when the valve member 14 is in the open position. The slot 58 is sized to receive the key 50 of the stem 16 so that the valve member 14 can be rotated about the trunnion axis 48 via rotation of the stem 16.

A first trunnion bushing or bearing 60 is mounted on the first trunnion 54, and a second trunnion bushing or bearing 62 is similarly mounted on the second trunnion 56. A bearing retainer 64 is positioned about the first bearing 60 and extends longitudinally across the valve chamber 28 to engage opposing surfaces of the body assembly 12 so as to longitudinally support the first trunnion 54 of the valve member 14 within the valve chamber 28. The bearing retainer 64 includes a retainer body 65 and a pair of spacers 66*a* and 66*b*. The bearing retainer 64 is configured to allow for a small gap between the body 22 and the valve member 14 while permitting the use of an internally mounted stem without sacrificing bearing load strength. A bearing retainer 67 is positioned about the second trunnion bearing 62 and extends across the valve chamber 28 to engage opposing surfaces of the body assembly 12 so as to longitudinally support the second trunnion 56 within the valve chamber 28. The construction of the bearing retainer 67 is similar to that of the bearing retainer 64, except as noted below, in that it is configured to allow for a small gap between the body 22 and the valve member 14. However, it will be appreciated that the bearing retainer 67 may also take the form of any suitable bearing retainer known in the art.

Figure 2:
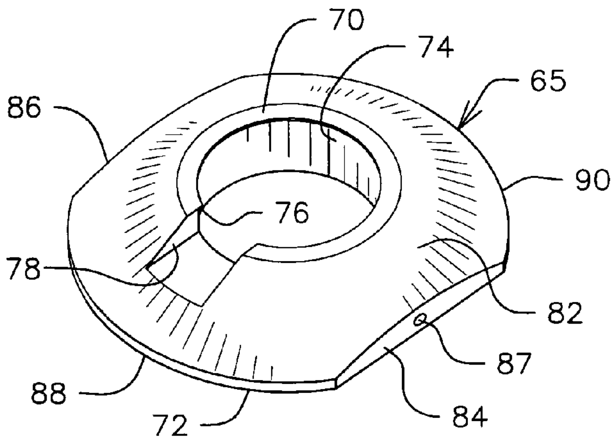
FIG. 2 is a perspective view of a retainer body constructed in accordance with the present invention.

Referring now to FIG. 2, the retainer body 65 of the bearing retainer 64 is illustrated. The retainer body 65 is a generally frusto-conically shaped member constructed of a rigid and durable material, such as steel or stainless steel. The retainer body 65 has first side 70, an opposing second side 72, and a bearing receiving opening 74 extending from the first side 70 to the opposed second side 72. The bearing receiving opening 74 is dimensioned to receive the first trunnion bearing 60 and the first trunnion 54 of the valve member 14 so that the valve member 14 is laterally supported in the valve chamber 28 while permitting the first trunnion 54 to rotate relative to the first trunnion bearing 60. The retainer body 65 is provided with a lip 76 that extends radially into the bearing receiving opening 74 at the first end 70 of the retainer body 65 to the first trunnion bearing 60 within the bearing retaining opening 74.

Figure 5:
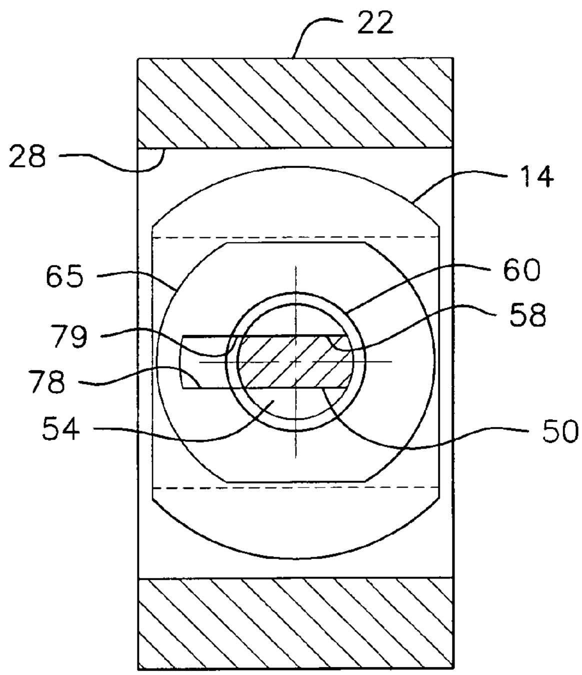
FIG. 5 is a horizontal cross section of the body of the valve with the valve member and retainer body positioned therein showing the slot of the bearing retainer oriented parallel with the direction of flow.
Figure 6:
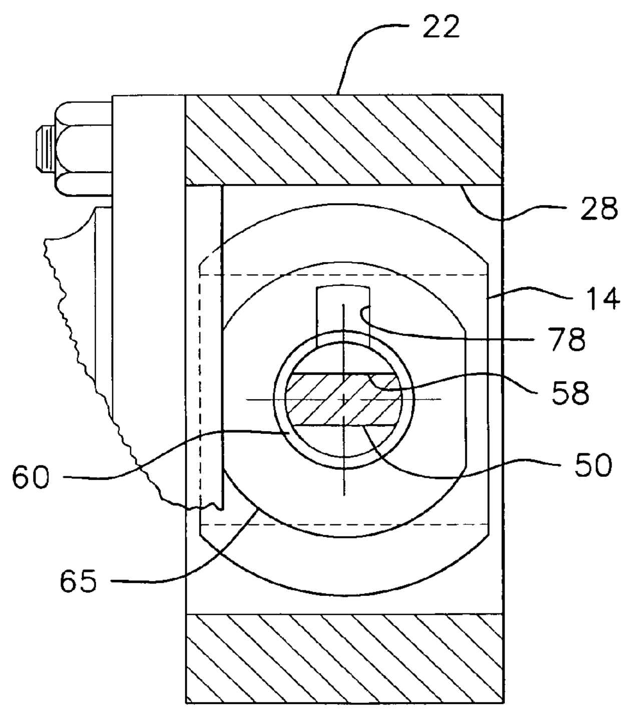
FIG. 6 is a cross sectional view showing the retainer body of FIG. 5 rotated so that the slot of the bearing retainer is perpendicular to the direction of flow and the valve member in an open position.

As shown in FIG. 5, to assemble the valve 10, the valve member 14 is positioned in the valve chamber 28 of the body 22 with the first and second end adaptors 24 and 26 removed from the body 22. Alternatively, if the body 22 is integrally formed with one of the end adapters, the free end adapter is removed from the body 22. Prior to installing the valve member 14, the stem 16 is inserted into the stem bore 40 from within the body 22. With the stem 16 installed in the body 22, the valve member 14 is installed into the valve chamber 28 with the first trunnion bearing 60 and the retainer body 65 positioned about the first trunnion 54. To permit the bearing retainer 64 to be installed about the key 50 of the stem 16, the retainer body 65 is provided with a stem receiving slot 78 (FIGS. 2 and 5) formed in the first side 70 thereof in open communication with the bearing receiving opening 74. The stem receiving slot 78 is dimensioned to permit the key 50 of the stem 16 to pass therethrough as the valve member 14, together with the first trunnion bearing 60 and the retainer body 65, is positioned in the valve chamber 28 when the key 50 is oriented in a parallel relationship with respect to the longitudinal flow axis 34. It will be appreciated that the first trunnion bearing 60 is also provided with a slot 79 that is aligned with the stem receiving slot 78 so that the first trunnion bearing 60 is able to be moved freely past the key 50 of the stem 16.

Likewise, the second trunnion bearing 62 and the bearing retainer 67 are positioned about the second trunnion 56. However, because the bearing retainer 67 does not interact with the stem 16, the bearing retainer 67 does not require a stem receiving slot.

While the stem receiving slot 78 permits the retainer body 65 to be received about the key 50 of the stem 16, the formation of the stem receiving slot 78 significantly reduces the bearing support surface along the longitudinal axis of the stem receiving slot 78. The retainer body 65 is positioned in the valve body 22 or (valve chamber 28) with the longitudinal axis of the stem receiving slot 78 oriented in a parallel relationship with respect to the longitudinal flow axis 34. It is appreciated by those of ordinary skill in the art that maximum loads on the retainer body 65 will occur along the line extending parallel to the longitudinal flow axis 34. Therefore, when the retainer body 65 is positioned in the valve chamber 28 with the longitudinal axis of the stem receiving slot 78 oriented in a parallel relationship with respect to the longitudinal flow axis 34, the strength of the retainer body 65 is compromised due to the reduced bearing support surface at the critical point.

To overcome the loss of critical bearing surface area at the stem receiving slot 78, the retainer body 65 has a frusto-conical surface 82 (FIG. 2) formed between the first side 70 and the second side 72 such that the retainer body 65 is rotatable, from an assembly position (FIG. 5) to an operating position (FIG. 6), within the valve chamber 28 about the first trunnion 54 upon the valve member 14, the first trunnion bearing 60, and the retainer body 65 being positioned in the valve chamber 28 with the key 50 of the stem 16 engaged with the valve member 14. As such, the retainer body 65 may be rotated about the first trunnion 54 so that the stem receiving slot 78 is perpendicular to the longitudinal flow axis 34. The weakened bearing surface area is thus rotated to a point where minimum loads are experienced.

As described above, the central slot 58 of the first trunnion 54 is preferably oriented along a line parallel to the plane defined by the axis of the central bore 52 and the common axis of the first trunnion 54 and the second trunnion 56. As show in FIG. 7, this orientation has the effect of creating additional surface area for distributing loads when the valve member 14 is in the closed position and the load on the retainer body 65 is at its highest.

Figure 2A:
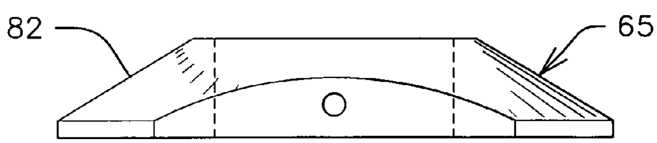
FIG. 2A is a side elevational view of the retainer body of FIG. 2.

As best shown in FIG. 2A, the frusto-conical surface 82 is radially turned such that the frusto-conical surface 82 has the contour of a portion of a standard cone.

Figure 3:
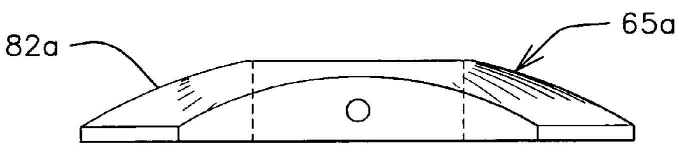
FIG. 3 is a side elevational view of another embodiment of a retainer body constructed in accordance with the present invention.

FIG. 3 illustrates another embodiment of a retainer body 65*a* which is identical in construction to the retainer body 65 with exception that the retainer body 65*a* has a frusto-conical surface 82*a* which is spherically turned such that the frusto-conical surface 82*a* has the contour of a portion of a sphere.

Returning to FIG. 2, the retainer body 65 is further characterized as having a first planar end 84 and an opposing second planar end 86. The first planar end 84 is formed so as to intersect the frusto-conical surface 82 and extend substantially parallel to the plane defined by the intersection of the longitudinal axis of the stem receiving slot 78 and the axis of the bearing receiving opening 74. Likewise, the second planar end 86 intersects the frusto-conical surface 82 and extends substantially parallel to the plane defined by the intersection of the longitudinal axis of the stem receiving slot 78 and the axis of the bearing receiving opening 74. The first planar end 84 and the second planar end 86 provide support surfaces for engagement with the first and second end adaptors 24 and 26 when the valve 10 is assembled. Each of the first planar end 84 and the second planar end 86 is provided with an opening 87 for connection of the spacers 66*a* and 66*b*, respectively, in a manner to be discussed below.

The retainer body 65 further includes a third end 88 and a fourth end 90. The third and fourth ends 88 and 90 are arc shaped and intersect the frusto-conical surface 82.

Figure 4:
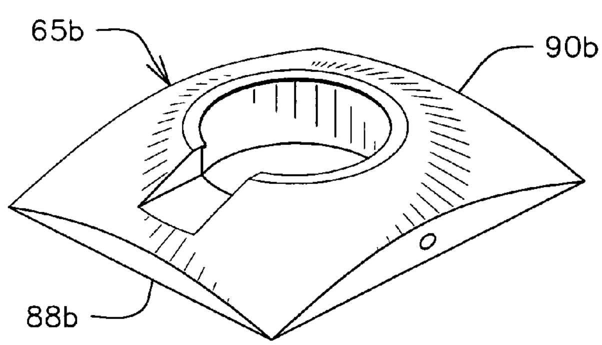
FIG. 4 is a perspective view of another embodiment of a retainer body constructed in accordance with the present invention.

FIG. 4 illustrates another embodiment of a retainer body 65*b* which is similar in construction to the retainer body 65 with the exception that the retainer body 65*b* has a third end 88*b* and a fourth end 90*b* which are formed to have a planar shape. As such, the retainer body 65*b* has a generally rectangular, frusto-conical shape.

It will be appreciated that when the retainer body 65 is formed to have a width from the first planar end 84 to the second planar end 86 that permits engagement of the first planar end 84 with the first end adaptor 24 and engagement of the second planar end 86 with the second end adaptor 26, the area of the first planar end 84 and the second planar end 86 will be a relatively small area. As such, the ultimate load carrying ability of the retainer body 65 is reduced. By decreasing the width between the first planar end 84 and the second planar end 86, the surface area of the first planar end 84 and the surface area of the second planar end 86 are caused to increase to provide a larger surface area to support increased loading. The manner of laterally supporting the retainer body 65 with a reduced width is described below.

Figure 8:
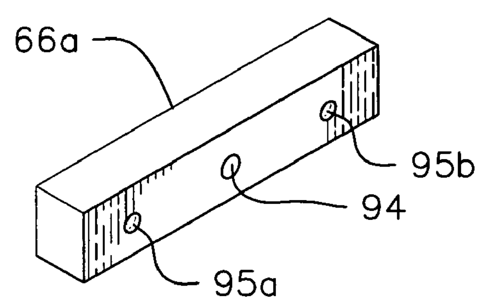
FIG. 8 is a perspective view of a spacer constructed in accordance with the present invention.
Figure 9:
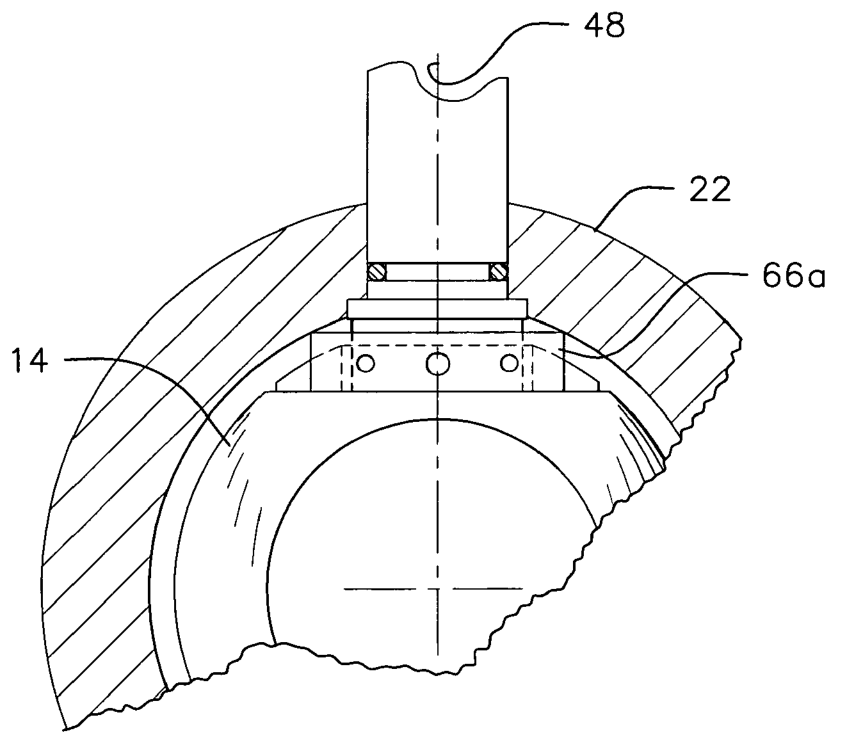
FIG. 9 is a cross sectional side view of a portion of the valve showing one of the spacers in contact with the body of the valve.

FIG. 8 illustrates the first spacer 66*a*. The second spacer 66*b* is identical in construction to the first spacer 66*a*. Thus, only the first spacer 66*a* will be described in detail. The first spacer 66*a* is a generally rectangular member adapted to be positioned between the first planar end 84 of the retainer body 65 and the first end adapter 24. However, the spacer 66*a* may be formed to have a variety of configurations so long as the spacer 66*a* functions as described below. As best shown in FIG. 1, the first spacer 66*a* abuts the first end adapter 24 and the first planar end 84 of the retainer body 65 to support the retainer body 65 relative to the body assembly 12 and thus apply a specific preload on the retainer body 65. As best shown in FIG. 9, the first spacer 66*a* is further adapted to be positioned between the body 22 and the valve member 14 such that the first spacer 66*a* abuts the body 22 and the valve member 14 to prevent movement of the retainer body 65 along the axis of the first trunnion 54.

Figure 10:
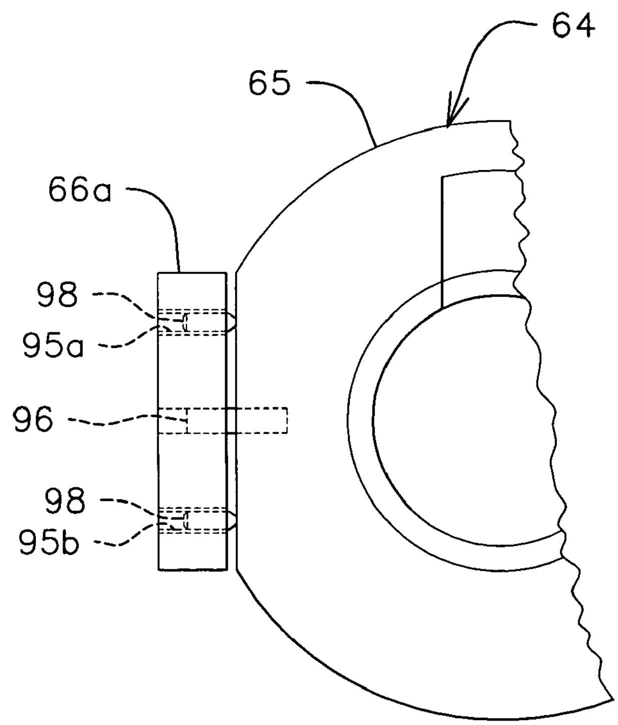
FIG. 10 is a top plan view of a portion of the bearing retainer.

Referring again to FIG. 8, the spacer 66*a* has a central bore 94 extending from one side to the opposing side. The bore 94 is adapted to be aligned with the opening 87 of the retainer body 65 upon rotation of the retainer body 65 to the operating position. Upon the retainer body 65 being rotated to the operating position, the spacer 66*a* of appropriate size is connected to the retainer body 65 with a connector member 96 (FIG. 10). Likewise, the spacer 66*b* is connected to the retainer body 65 to achieve the desired overall width of the retainer body 64. The connector member 96 may be any suitable device capable of securing the spacer 66*a* to the retainer body 65, such as a pin, bolt or screw. In addition, as illustrated in FIG. 10, the spacer 66*a* may be constructed to allow the spacer 66*a* to be adjusted inwardly and outwardly relative to the retainer body 65 by a pair of screws 98 disposed in the bores 95*a* and 95*b* to achieve the desired overall width of the bearing retainer 64. With the spacers 66*a* and 66*b* connected to the retainer body 65, the first and second end adapters 24 and 26 are connected to the body 22.

Figure 11:
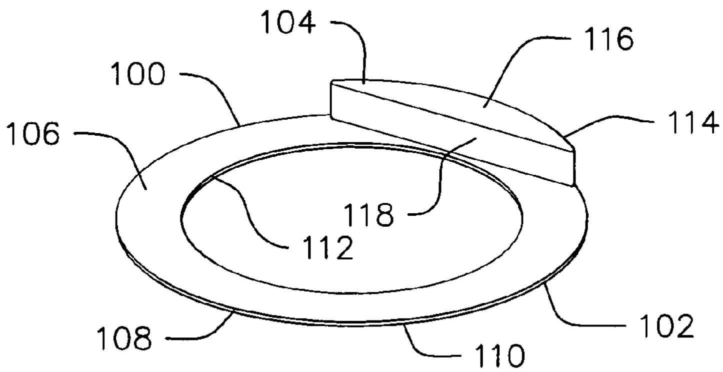
FIG. 11 is a perspective view of a ring spacer constructed in accordance with the present invention.
Figure 12:
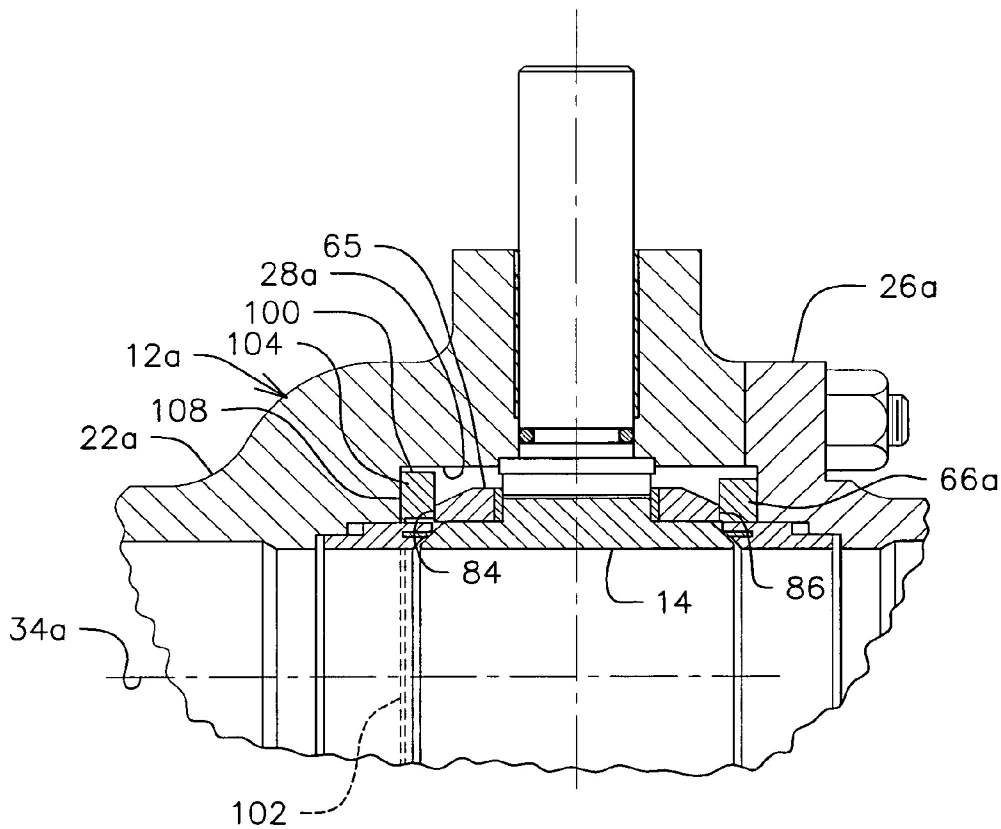
FIG. 12 is a partial, vertical cross section of another embodiment of a trunnion valve constructed in accordance with the present invention.

Referring now to FIGS. 11 and 12, in instances when a body assembly 12*a* is of two piece construction where the body assembly 12*a* includes an end adapter 26*a* and a body 22*a* integrally formed with an end adapter, the planar end of the retainer body 65 is positioned adjacent the integrally formed end adapter upon rotation of the retainer body 65 to the operating position. Thus, the planar end of the retainer body 65 is not accessible for connection of the spacer 66*b*. FIG. 11 illustrates a ring spacer 100 positionable between the retainer body 65 and the body 22. The ring spacer 100 has a ring portion 102 and a spacer portion 104. The ring portion 102 has a first surface 106, a second surface 108, an outer peripheral edge 110, and inner peripheral edge 112. The spacer portion 104 extends from the first surface 106 of the ring portion 102 and has an outer peripheral surface 114 extending coextensively with the outer peripheral edge 110 of the ring portion 102. The spacer portion 104 further has an outer planar surface 116 adapted to abuttingly engage the first planar end 84 or the second planar end 86 and a planar surface 118 adapted to abuttingly engage the valve member 14.

In use, the ring spacer 100 positioned in a valve chamber 28*a* in a concentric relationship with respect to the longitudinal flow axis 34*a* with the second surface 108 engaged with the body 22*a* and rotated to a position where the spacer portion 104 is in a non-interfering relationship with rotation of the retainer body 65 between the assembly position and the operating position. After insertion of the retainer body 65 into the valve chamber 28*a* and rotation of the retainer body 65 to the operating position, the ring spacer 100 is rotated to position the spacer portion 104 between the first planar end 84 of the retainer body 65 and the body 22*a*. The ring spacer 100 may be rotated with any suitable device. A spacer 66*a* is positioned between the second planar end 86 of the bearing retainer 65 and the end adapter 26*a* in a substantially similar manner as described above.

Changes may be made in the combinations, operations and arrangements of the various parts and elements described herein without departing from the spirit and scope of the invention as defined in the following claims.

What is claimed:

1. A valve, comprising:

a valve body having a valve chamber and an inlet passage and an outlet passage in communication with the valve chamber;

a valve member positioned in the valve chamber and movable between an open position and a closed position, the valve member having a flow passage formed therethrough for providing fluid communication between the inlet passage and the outlet passage of the valve body when the valve member is in the open position, the valve member having at least one trunnion extending therefrom;

a stem having one end positioned in the valve chamber and engaged with the valve member and another end extending from the valve body, the stem rotatable to cause the valve member to move between the open position and the closed position;

a bearing disposed about the trunnion; and a bearing retainer disposed about the bearing, the bearing retainer having a retainer body with a bearing receiving opening extending from a first side to an opposed second side and a stem receiving slot formed in the first side thereof in open communication with the bearing receiving opening, the retainer body configured such that the retainer body is rotatable within the valve chamber of the valve body about the trunnion upon the valve member, the bearing, and the bearing retainer being positioned in the valve chamber with the stem engaged with the valve member.

2. The valve of claim 1 wherein the retainer body is rotatable through an angle of approximately 90 degrees.

3. The valve of claim 1 wherein the retainer body has a frusto-conical surface formed between the first end and the second end extending substantially circumferentially about the bearing receiving opening.

4. The valve of claim 3 wherein the frusto-conical surface of the bearing retainer is a spherical, frusto-conical surface.

5. The valve of claim 1 wherein the retainer body has a first planar side intersecting the frusto-conical surface and extending substantially parallel to a plane defined by the intersection of the axis of the bearing receiving opening and a longitudinal axis of the stem receiving slot and an opposing second planar side.

6. The valve of claim 5 wherein the valve further comprises a first end adapter connectable to one end of the valve body and a second end adapter connectable to another end of the valve body, and wherein the bearing retainer further comprises:

a first spacer positioned between the first planar end of the bearing retainer and the first end adapter such that the first spacer engages the first end adapter and the first end of the bearing retainer; and a second spacer positioned between the second planar end of the bearing retainer and the second end adapter such that the second spacer engages the second end adapter and the second end of the bearing retainer.

7. The valve of claim 6 wherein the first spacer is removably attached to the first planar end of the bearing retainer and the second spacer is removably attached to the second planar end of the bearing retainer.

8. The valve of claim 5 wherein the valve further comprises an end adapter connectable to one end of the valve body, and wherein the bearing retainer further comprises:

a ring spacer positionable between the bearing retainer and the valve body, the ring spacer having a ring portion and a spacer portion, the ring portion having a first surface, an opposing second surface, an outer peripheral edge, and inner peripheral edge, the spacer portion extending from the first surface of the ring portion and having an outer planar surface adapted to abuttingly engage the first planar end of the bearing retainer, the ring spacer being rotatable within the valve chamber between a non-interfering position and a spacer position, in the non-interfering position the ring spacer positioned within the valve chamber to permit rotation of the retainer body and in the spacer position the ring spacer positioned between the first planar end of the bearing retainer and an opposing surface of the valve body.

9. The valve of claim 8 further comprising:

a spacer positioned between the second planar end of the bearing retainer and the end adapter such that the spacer engages the end adapter and the second planar end of the bearing retainer.

10. The valve of claim 9 wherein the spacer is removably attached to the second planar end of the bearing retainer.

11. The valve of claim 5 wherein the retainer body further includes a third planar side intersecting the frusto-conical surface extending substantially perpendicular to the plane defined by the intersection of the axis of the bearing receiving opening and the longitudinal axis of the stem receiving slot and an opposing fourth planar side.

12. A bearing retainer for a valve having an internally mounted stem and valve member with a trunnion and a bearing positioned thereabout, the bearing retainer comprising:

a retainer body having a bearing receiving opening extending from a first side to an opposed second side and a stem receiving slot formed in the first side thereof in open communication with the bearing receiving opening, the retainer body disposable about the bearing and the retainer body configured such that the retainer body is rotatable about the trunnion upon the valve member, the bearing, and the bearing retainer being positioned in the valve chamber with the stem engaged with the valve member.

13. The bearing retainer of claim 12 wherein the retainer body is rotatable through an angle of approximately 90 degrees.

14. The bearing retainer of claim 12 wherein the retainer body has a frusto-conical surface formed between the first end and the second end extending substantially circumferentially about the bearing receiving opening.

15. The bearing retainer of claim 14 wherein the frusto-conical surface of the bearing retainer is a spherical, frusto-conical surface.

16. The bearing retainer of claim 12 wherein the retainer body has a first planar side intersecting the frusto-conical surface and extending substantially parallel to a plane defined by the intersection of the axis of the bearing receiving opening and a longitudinal axis of the stem receiving slot and an opposing second planar side.

17. The bearing retainer of claim 16 further comprising:

a first spacer positionable between the first planar end of the retainer body and a first end adapter of the valve such that the first spacer engages the first end adapter and the first end of the retainer body; and a second spacer positionable between the second planar end of the retainer body and a second end adapter of the valve such that the second spacer engages the second end adapter and the second end of the retainer body.

18. The bearing retainer of claim 17 wherein the first spacer is removably attached to the first planar end of the retainer body and the second spacer is removably attached to the second planar end of the retainer body.

19. The bearing retainer of claim 16 further comprising:

a ring spacer positionable between the retainer body and a body of the valve, the ring spacer having a ring portion and a spacer portion, the ring portion having a first surface, an opposing second surface, an outer peripheral edge, and inner peripheral edge, the spacer portion extending from the first surface of the ring portion and having an outer planar surface adapted to abuttingly engage the first planar end of the retainer body, the ring spacer being rotatable within the body of the valve between a non-interfering position and a spacer position, in the non-interfering position the ring spacer positioned within the body of the valve to permit rotation of the retainer body and in the spacer position the ring spacer positioned between the first planar end of the bearing retainer and an opposing surface of the body of the valve.

20. The bearing retainer of claim 19 further comprising:

a spacer positionable between the second planar end of the retainer body and an end adapter such that the spacer engages the end adapter and the second planar end of the bearing retainer.

21. The bearing retainer of claim 20 wherein the spacer is removably attached to the second planar end of the retainer body.

22. The bearing retainer of claim 16 wherein retainer body further includes a third planar side intersecting the frusto-conical surface and extending substantially perpendicular to the plane defined by the intersection of the axis of the bearing receiving opening and the longitudinal axis of the stem receiving slot and an opposing fourth planar side.

23. A method of assembling a valve, comprising:

providing a valve body having a valve chamber and an inlet passage and an outlet passage in communication with the valve chamber;

mounting internally a stem through a stem bore formed through the valve body so that the stem has a first end positioned in the valve chamber and a second end extending from the valve body;

providing a valve member having a flow passage formed therethrough, the valve member having at least one trunnion extending therefrom;

disposing a bearing about the trunnion;

disposing a bearing retainer about the bearing, the bearing retainer having a retainer body with a bearing receiving opening extending from a first side to an opposed second side and a stem receiving slot formed in the first side thereof in open communication with the bearing receiving opening;

aligning the slots of the valve member, the bearing, and the retainer body with the first end of the stem;

inserting the combination of the valve member, the bearing, and the bearing retainer into the valve chamber so that the retainer body and the bearing move past the first end of the stem and the stem is matingly engaged with the slot of the trunnion; and rotating the retainer body about the trunnion so that a longitudinal axis of the stem receiving slot of the retainer body is in a non-parallel relationship with the longitudinal flow axis of the valve body.

24. The method of claim 23 further comprising rotating the retainer body approximately 90 degrees so that the longitudinal axis of the stem receiving slot is perpendicular to the longitudinal flow axis.

25. The method of claim 23 wherein the retainer body has a first planar end extending substantially parallel to a plane defined by the intersection of the longitudinal axis of the stem receiving slot and the axis of the bearing receiving opening and an opposing second planar side, and wherein the method further comprises:

positioning a first spacer adjacent the first planar end of the retainer body;

connecting a first end adapter to the valve body such that the first spacer engages the first end adapter and the first end of the bearing retainer;

positioning a second spacer adjacent the second planar end of the retainer body; and connecting a second end adapter to the valve body such that the second spacer engages the second end adapter and the second end of the bearing retainer.

26. The method of claim 23 wherein the retainer body has a first planar end extending substantially parallel to a plane defined by the intersection of the longitudinal axis of the stem receiving slot and the axis of the bearing receiving opening and an opposing second planar side, and wherein the method further comprises:

positioning a ring spacer in the valve chamber prior to inserting the combination of the valve member, the bearing, and the retainer body so that ring spacer is in a non-interfering position relative to the retainer body to permit rotation of the retainer body, the ring spacer having a ring portion and a spacer portion, the ring member having a first surface, an opposing second surface, an outer peripheral edge, and inner peripheral edge, the spacer portion extending from the first surface of the ring portion and having an outer planar surface adapted to abuttingly engage the first planar end of the retainer body; and rotating the ring spacer subsequent to rotating the retainer body to position the spacer portion of the ring spacer between the first planar end of the bearing retainer and an opposing surface of the valve body.

27. The method of claim 26 further comprising:

positioning a spacer adjacent the second planar end of the retainer body; and connecting an end adapter to the valve body such that the spacer engages the end adapter and the second planar end of the bearing retainer.

* * * * *